J. S. ANTHONY.
AUTOMATIC SPEED CHANGING GEAR.
APPLICATION FILED APR. 28, 1906.

907,711.

Patented Dec. 29, 1908.

2 SHEETS—SHEET 2.

Witnesses;
Murray D. Badgley
Helen Oxford

Inventor
James S. Anthony
By Albert G. Davis
Att'y

UNITED STATES PATENT OFFICE.

JAMES S. ANTHONY, OF NEW YORK, N. Y., ASSIGNOR TO GENERAL ELECTRIC COMPANY, A CORPORATION OF NEW YORK.

AUTOMATIC SPEED-CHANGING GEAR.

No. 907,711.  Specification of Letters Patent.  Patented Dec. 29, 1908.

Application filed April 28, 1906. Serial No. 314,155.

*To all whom it may concern:*

Be it known that I, JAMES S. ANTHONY, a citizen of the United States, residing at New York, Manhattan, county of New York, State of New York, have invented certain new and useful Improvements in Automatic Speed-Changing Gear, of which the following is a specification.

My invention relates to self-propelled vehicles, and its object is to provide a simple and efficient automatic speed-changing gear which will give the proper relative speeds of prime mover and driving wheels under all conditions of operation, without attention from the driver.

It has been proposed heretofore to control the speed-changing gear between the engine and the driving wheels of a vehicle by an automatic device, such as a centrifugal governor, responsive to variations in speed in the engine. Such an arrangement is not suited to all conditions of service, especially with internal combustion engines, since such engines give their maximum output at high speed, and consequently on steep grades or bad roads, where a large amount of power is required for driving the vehicle, it is desirable and often necessary to run the engine at high speed, which cannot be done with such automatic devices as heretofore arranged.

One feature of my invention consists in employing electromagnetic clutches for actuating the speed-changing gears, and in connecting the automatic controlling device to the driving wheels, instead of to the engine, and so arranging it that when the vehicle is at rest the low-speed gear is thrown in. With this arrangement the gear is controlled according to the speed of the driving wheels, so that running on a good level road, the gears are actuated so as gradually to increase the speed of the vehicle up to its maximum, while on striking a grade or a bad road, which slows down the vehicle, the high speed gears are thrown out and the low-speed gears thrown in successively, so as to permit the engine to operate at high speed with maximum output, and to drive the vehicle through the low-speed gear.

My invention will best be understood by reference to the accompanying drawing, in which—

Figure 1:
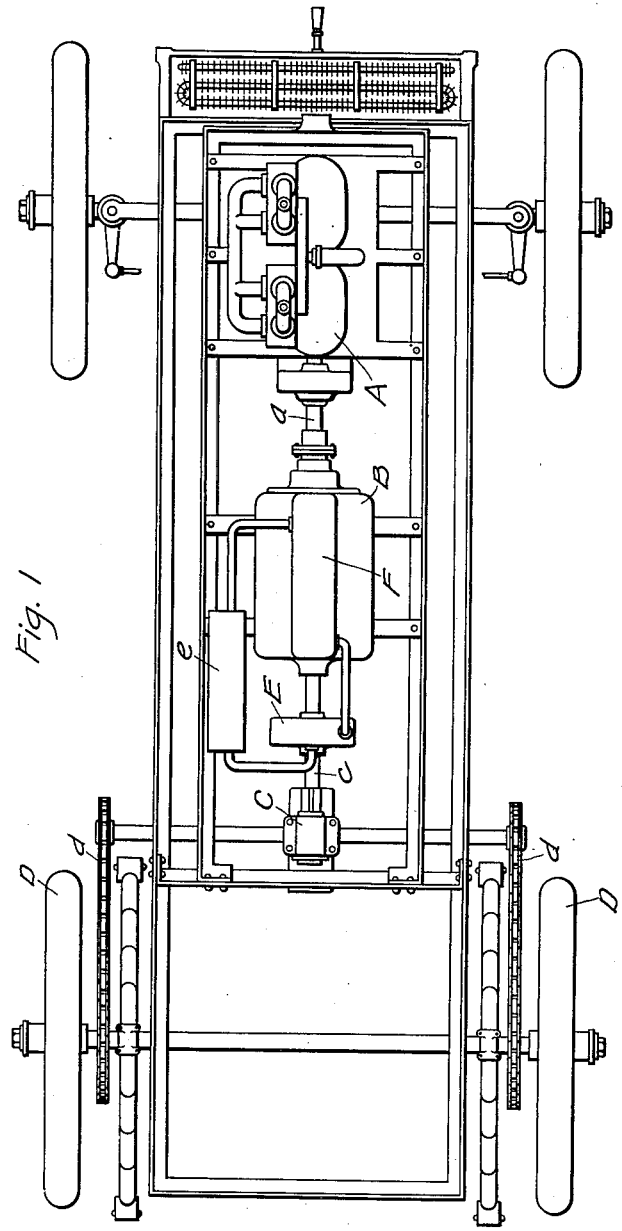
Figure 2:
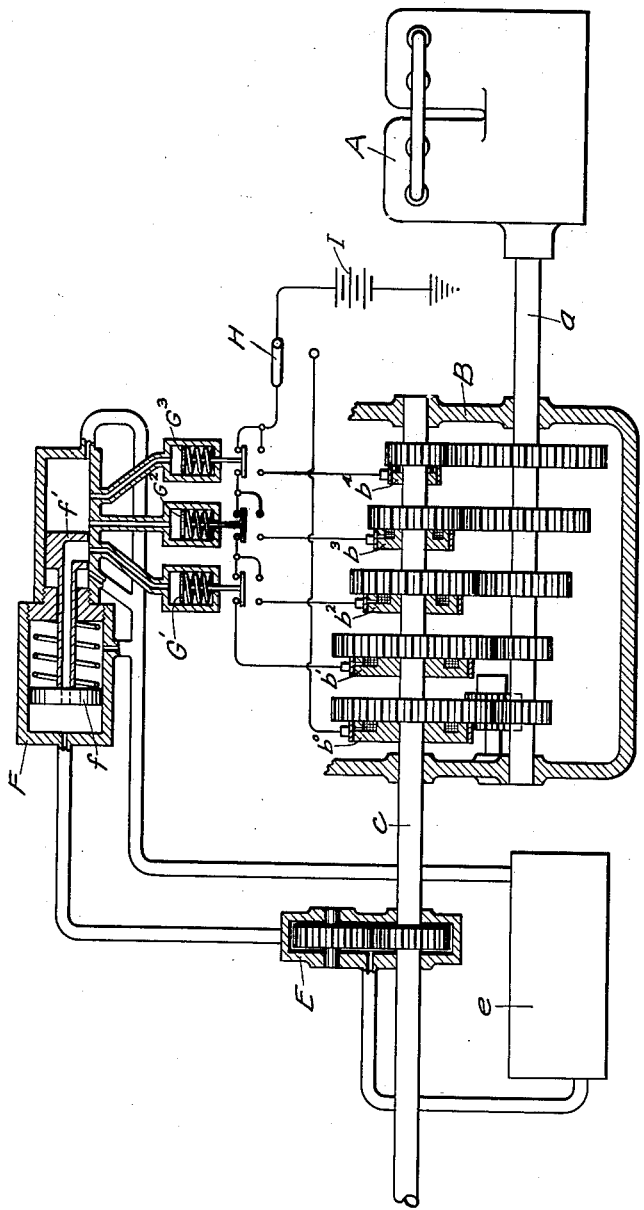

Figure 1 shows a plan view of the frame of an automobile provided with automatic speed-changing gears arranged in accordance with my invention; and Fig. 2 shows a detail view, partly in cross-section, of the gearing.

In the drawings, A represents a primemover, such as an internal combustion engine, with its shaft $a$ connected through the speed-changing gears B to a shaft $c$, which is connected through the differential gear C and sprocket-chain $d$ to the driving wheels D of the vehicle.

E represents a gear pump on the shaft $c$. This pump consequently revolves at a speed corresponding to the speed of the driving wheels, and produces a fluid-pressure corresponding to this speed. The pump delivers oil, or other suitable fluid from the reservoir $e$ to the pressure-actuated device F, which controls the speed-changing gearing. This device, as shown in Fig. 2, comprises a spring-actuated piston $f$ subjected to the pressure from the gear pump E and a valve $f'$ connected to the piston $f$ and controlling three spring-actuated pistons $G^1$, $G^2$ and $G^3$ connected to switch contacts in circuit with the magnetic clutches controlling the speed-changing gears. Ports communicating with the reservoir $e$ are provided for returning to the reservoir the fluid which leaks around piston $f$ and under the valve $f'$.

H represents a hand-operated switch in circuit with the clutches, and with the source of current indicated by the battery I. To start the engine, switch H may be opened, thereby disconnecting the engine from the driving wheel by deënergizing all the clutches. With the vehicle at rest, so that no pressure is generated by the pump E, the switch-contacts and the piston $f$ are in the position shown in Fig. 2, so that when switch H is closed, as shown in this figure, the clutch $b^1$ of the low-speed gear is energized. The engine is consequently connected to the driving wheel through the low-speed gear. As the vehicle speeds up, pump E produces a pressure, which, passing through the hollow rod of piston $f$, and through valve $f'$, actuates piston $G^1$ to move its switch to the other position. This cuts clutch $b^1$ out of circuit, and energizes clutch $d^2$, thereby increasing the speed of the vehicle. As the pressure generated by pump E further increases, piston $f$ is moved toward the right, so as to cut the pump off from piston $G'$ and to connect it to piston $G^2$. The pressure on this piston moves the second switch so as to cut clutch $b^2$ out of circuit and energize clutch $b^3$. A further increase of speed results, and upon a further increase of pressure generated by the pump, clutch $b^3$ is cut out and clutch $b^4$ is energized. On striking a grade or bad road, which slows down the vehicle, the reverse operation takes place; the lower speed clutches being consecutively cut in. All this operation is automatic, and requires no attention from the operator. In order to reverse the gear, switch H is moved to its other position, so as to break the circuit of all the clutches $b^1$ to $b^4$, and to energize clutch $b^0$, the gear of which is connected to the engine shaft $a$ through an idler While I have illustrated and described a speed-responsive device comprising the gear-pump E and spring-actuated piston $f$, it will be understood that the particular construction of the device forms no part of my invention, and any other suitable speed-responsive device may be employed. Gear-pumps such as I have shown are well known in the art, as devices for producing a pressure proportional to the speed. It will, of course, be understood that there must be leakage in the pump system, either in the pump itself, between the gears and the casing, or around the piston $f$, or through a by-pass especially provided for that purpose. The arrangement of such a pump, to produce the pressure variations desired, is well understood in the art, and forms no part of my invention.

I do not desire to limit myself to the particular construction and arrangement of parts here shown, but aim in the appended claims to cover all modifications which are within the scope of my invention.

What I claim as new and desire to secure by Letters Patent of the United States, is,—

1. In a self-propelled vehicle, a prime mover, speed-changing gearing for varying the relative speeds of the prime mover and the driving wheels of the vehicle, said gearing including electro-magnetic clutches, and automatic means responsive to variations in the speed of the driving wheels controlling the circuits of said clutches.

2. In a self-propelled vehicle, a prime mover, speed-changing gearing for varying the relative speeds of the prime mover and the driving wheels of the vehicle, said gearing including electro-magnetic clutches, a pressure-generating device mechanically connected to the driving wheels, and means responsive to variations in the pressure generated in said device controlling the circuits of said clutches.

3. In a self-propelled vehicle, a prime mover, speed-changing gearing for varying the relative speeds of the prime mover and the driving wheels of the vehicle, said gearing including electro-magnetic clutches, and means responsive to variations in the speed of the driving wheels controlling the circuits of said clutches, said controlling means being arranged to close the circuit of the low-speed clutch when the driving wheels are at rest.

4. In a self-propelled vehicle, a prime mover, speed-changing gearing connecting the prime mover to the driving wheels of the vehicle, a speed-responsive device mechanically connected to the driving wheels, and operative connections between said device and said gearing whereby said gearing is adapted to change the relative speeds of the prime mover and the driving wheels at predetermined speeds of the driving wheels.

5. In a self-propelled vehicle, a prime mover, speed-changing gearing connecting the prime mover to the driving wheels of the vehicle, said gearing including electro-magnetic clutches, a speed-responsive device mechanically connected to the driving wheels, and switch contacts in circuit with said clutches and controlled by said device whereby said gearing is adapted to change the relative speeds of the prime mover and driving wheels at predetermined speeds of the driving wheels.

6. In a self-propelled vehicle, a prime mover, speed-changing gearing connecting the prime mover to the driving wheels of the vehicle, said gearing including electro-magnetic clutches, a speed-responsive device mechanically connected to the driving wheels, and switch contacts in circuit with said clutches and controlled by said device whereby said gearing is adapted to change the relative speeds of the prime mover and driving wheels at predetermined speeds of the driving wheels, said contacts being arranged to close the circuit of the low-speed clutch when the driving wheels are at rest.

In witness whereof, I have hereunto set my hand this twenty sixth day of April, 1906.

JAMES S. ANTHONY.

Witnesses:
 EDGAR E. CAFFALL,
 JOHN W. BELL.